United States Patent [19]

Cook

[11] Patent Number: 4,565,160
[45] Date of Patent: Jan. 21, 1986

[54] LIVESTOCK TREATMENT SYSTEM

[76] Inventor: Melvin J. Cook, HCOI, Box 231, Mesa, Wash. 99343

[21] Appl. No.: 595,252

[22] Filed: Mar. 30, 1984

[51] Int. Cl.⁴ ............................................. A01K 13/00
[52] U.S. Cl. .................................. 119/159; 239/127; 239/307
[58] Field of Search ................... 119/14.03, 158, 159; 239/127, 306, 307, 310

[56] References Cited

U.S. PATENT DOCUMENTS

| | | | |
|---|---|---|---|
| 2,397,855 | 4/1946 | Grams | 119/159 |
| 2,658,796 | 11/1953 | Kopperschmidt | 239/127 X |
| 2,731,300 | 1/1956 | Jansen | 299/111 |
| 2,830,559 | 4/1958 | McMurray | 119/159 |
| 3,183,890 | 5/1965 | Albers | 119/159 |
| 3,221,708 | 12/1965 | Marley | 119/158 |
| 3,267,903 | 8/1966 | Valentine | 119/1 |
| 3,529,577 | 9/1970 | McMenemy, Jr. | 119/159 |
| 3,554,166 | 1/1971 | Belden | 119/159 |
| 3,713,423 | 1/1973 | Sparr, Sr. | 119/1 |
| 3,763,828 | 10/1973 | Tighe | 119/158 |
| 3,969,608 | 7/1976 | Day | 239/127 X |
| 4,379,438 | 4/1983 | Peardon | 119/158 X |
| 4,379,440 | 4/1983 | Thedford et al. | 119/159 |

FOREIGN PATENT DOCUMENTS 1464541 2/1977 United Kingdom ................ 119/159

*Primary Examiner*—Robert P. Swiatek
*Attorney, Agent, or Firm*—Wells, St. John & Roberts

[57] ABSTRACT

An animal treatment system for mechanically applying a mixture of flowable carrier fluids such as water and material such as slave or molasses that may be reduced to a flowable state by application of heat. The system includes a supply assembly by which a carrier fluid is heated and subsequently injected into a container holding the material. The heated carrier liquid serves to "melt" the material and allow it to flow and mix with the carrier material. This mixture is cycled through the system and maintained in the heated state until discharged by an applicator.

16 Claims, 4 Drawing Figures

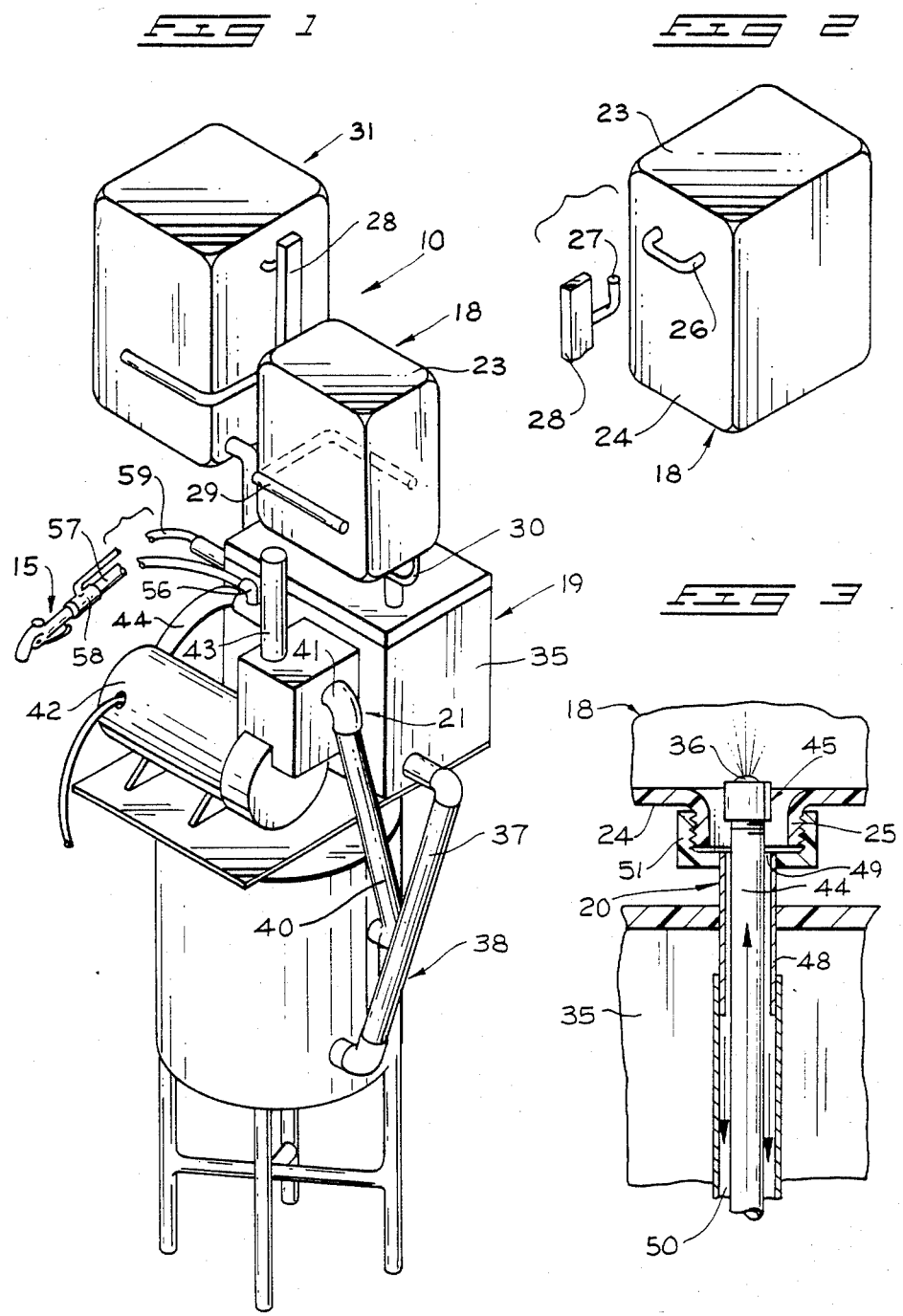

LIVESTOCK TREATMENT SYSTEM

FIELD OF THE INVENTION

The present invention relates to livestock treatment by mechanical application of a heated mixture of a carrier liquid and normally viscous material such as salve or molasses directly to the livestock or to the livestock feed.

BACKGROUND OF THE INVENTION

Caring for and treating herds of milk cows is a tedious and time-consuming task notwithstanding the effort and time involved in milking procedures. For example, it is prudent to treat the udder and teats of each cow following milking. This is usually done by hand with a salve Salves prevent chafing and irritation caused by the milking machines. If chafed areas develop and are allowed to become infected, still further treatment with antiseptic becomes required. Persistent irritation and infections can effect the cow's milk production, temperament, and can eventually lead to complete loss of production until a cure is complete.

Needless to say, rubbing down each cow's udder and teats after each milking is tedious work and easy to "put off". It has therefore become desirable to obtain some form of mechanical applicator that would encourage treatment with salves by decreasing the required effort and application time.

The problem encountered, though, is reducing salve to a liquid consistency suitable for application by mechanical means. Petroleum-based salves will liquify when heated above ambient temperatures. Higher temperatures correspondingly lower the viscosity. The material thickens again as it cools. Temperatures must be carefully maintained to keep the salve material in a liquified state. Cooled, solidified salve would quickly clog an applicator unit.

Another problem encountered with mechanical application of liquified salves is the rate or density of application. A liquified salve sprayed at full strength will invariably result in over-application, often within a localized treatment area. This can be corrected only by rubbing to spread the excess material over adjacent untreated areas—an unsatisfactory solution since the primary purpose of quickly and easily applying the salve is defeated.

Somewhat similar problems are also encountered when it becomes desirable to augment grain or other feed with molasses as a food supplement treatment for livestock. In the past this has been possible only by complicated industrial processes not typically available to the farmer or rancher. The expense incurred in having feed treated is often prohibitive.

Spraying devices have been developed to aid dairymen in applying liquid antiseptic or other liquids to the udders and teats of cows. These represent only a partial solution to the problems. They operate well for applying a "liquid" but are unable to apply a salve treatment due to the same difficulties discussed above. Liquids that lend themselves to spraying cannot contain the same valuable softening and conditioning ingredients as salves.

An example of a liquid spray applicator is disclosed in U.S. Pat. No. 3,763,828 to Tighe. This patent discloses high-pressure application of a liquid through a spray nozzle actuated by a sophisticated electrical sensing mechanism and timer.

U.S. Pat. No. 3,554,166 to Belden discloses a spray head designed to spray a cleansing and disinfectant liquid onto cows udders and teats. Freely flowable liquids must be used with this system to allow passage through the spray nozzles.

Another form of spray treating apparatus is disclosed in U.S. Pat. No. 2,830,559 to McMurray. The spray nozzles in this device are attached by a halter arrangement to the animal so the liquid spray can be accurately directed against the udder area. Again as above, the device is intended for use with flowable liquids.

U.S. Pat. No. 3,529,577 to McMenemy is illustrative of a hand-held insecticide spraying device for livestock. A metering and valving arrangement allow control of solution mixture. All solutions are initially liquid and remain so as they are mixed and sprayed.

U.S. Pat. No. 3,267,903 to Valentine discloses a wand device for connection to a water hose for applying warm water through a brush. The wand and brush are used for cleaning cow udders. A sampling tray is attached to the brush end of the wand to assist milk sampling procedures prior to milking.

U.S. Pat. No. 3,713,423 to Sparr discloses another teat and udder cleanser and sanitizer. It includes a teat cup attached to a pressurized source of air and disinfectant solution. The cup can be fitted over individual teats and a valve operated to spray disinfectant over the teat and adjacent udder areas within the confines of the cup. A drain tube is openly connected to the cup to receive and drain off excess spray.

R. M. Grams was issued U.S. Pat. No. 2,379,855 for a pneumatic fly sprayer. The device makes use of the existing vacuum system of a milking machine to supply pressurized air to force a liquid insecticide spray from a nozzle.

Another spray cleansing device is disclosed in the Marley U.S. Pat. No. 3,221,708. This device makes use of a plurality of sprinkler heads arranged under protective hoods to spray jets of water on and over cows in a corral.

Albers in U.S. Pat. No. 3,183,890 uses spray nozzles attached to a network of pipes arranged in a chute configuration for guiding cows past the spray nozzles.

A brushless spray wand is disclosed in U.S. Pat. No. 2,731,300 to Jansen. Two separate valving arrangements are used, along with double nozzles for selectively spraying water against the udders and teats of cows before milking.

The above patents point to various attempts at mechanizing pre and post treatment of cows using water or other similar liquids. None, however, appropriately address the problem discussed above. A need has therefore remained for such an apparatus.

BRIEF DESCRIPTION OF THE DRAWINGS

A preferred embodiment of the present invention is illustrated in the accompanying drawings in which:

FIG. 1 is a pictorial view of the present apparatus;

FIG. 2 is a pictorial view of a salve material container and a section of a support;

FIG. 3 is an enlarged detail view showing the interrelationship of the container, liquid supply, and drain mechanism of the present invention.

DETAILED DESCRIPTION

Figure 4:
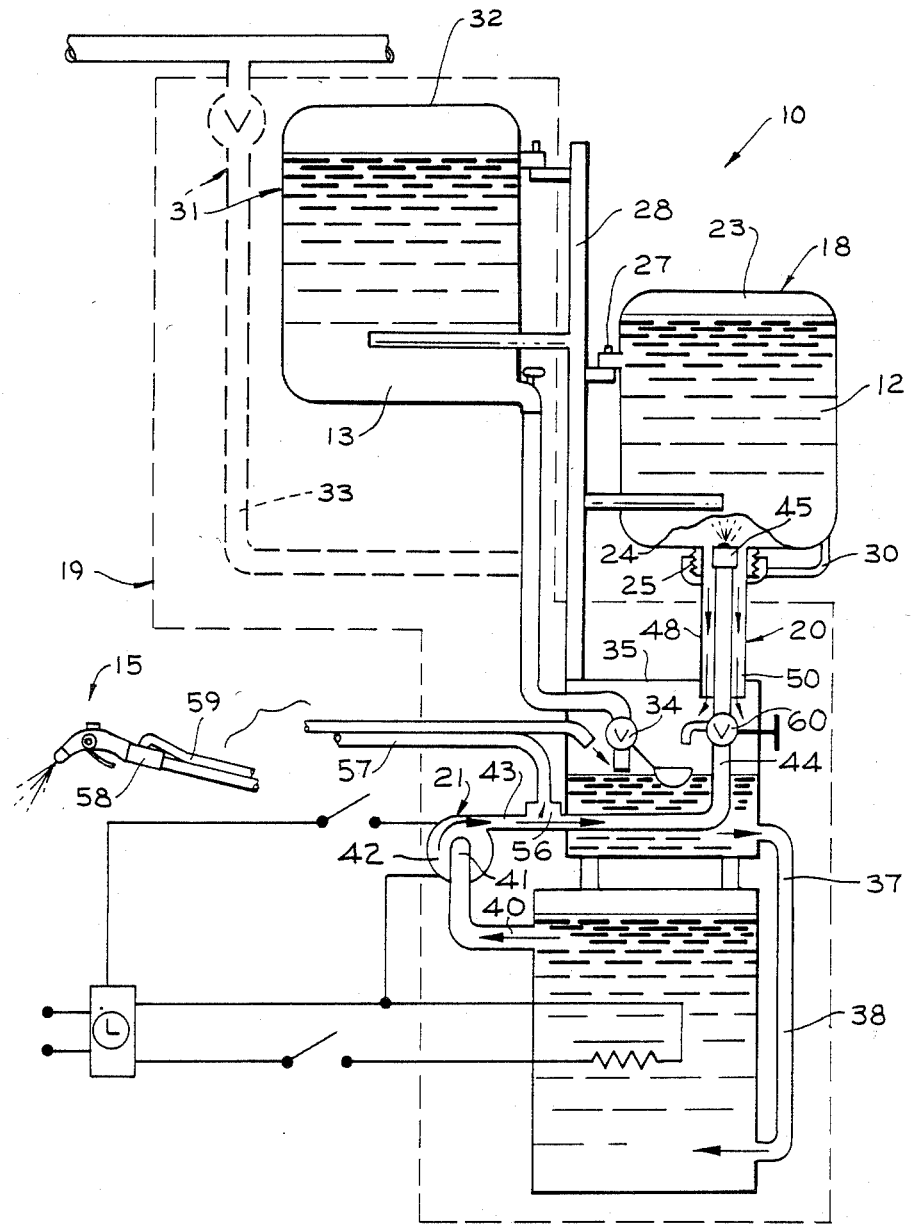
FIG. 4 is a schematic view showing the interrelationship of parts and demonstrating flow of liquids through the device.

In compliance with the constitutional purpose of the Patent Laws "to promote the progress of science and useful arts" (Article 1, Section 8), applicant submits the following disclosure of the invention.

The apparatus shown in the accompanying drawings is intended for use by dairymen, ranchers, or farmers to enable livestock treatment using a mixture of heated liquid such as water and a material reduced to liquid form by the heated liquid. The primary use of the device is seen in reducing materials such as salve with warm water for treatment by spray application to the teats and udders of milk cows. Another potential use of the present system is envisioned as well in the area of feed treatment for livestock where a sprayed mixture of liquified molasses and water may be applied to feed grain or other materials.

FIGS. 1 and 4 of the drawings best exemplify the general components of the present applicator 10. FIG. 1 represents the structural components and their interrelationships while FIG. 4 represents the components in schematic representation and their operational relationships.

FIG. 4 indicates a quantity of normally non or slow flowing material 12 such as salve or molasses. Both salve and molasses are similar in their physical characteristics in that both are highly viscous at normal ambient temperatures and both become more flowable when heated. Both, in fact, can become sufficiently flowable to be dispensed as by spraying. The present system involves apparatus described below for heating the material 12 to a flowable state, mixing the material with a carrier material 13 such as water, and dispensing the mixture. In the case of salves, an applicator means 15 may be used to directly apply a treatment of heated, flowable salve and water to the udder and teats of milk cows. When molasses is used as the material 12, the mixture with the carrier liquid (water) can be applied as a nutritional livestock treatment to grain or other feed as a food and nutrient supplement. Other additives can also be included, such as disinfectants or antiseptics, in the liquid or material as needed.

A holding container is shown at 18 for the material 12. The container can be removably mounted to the present structure and attached in such a manner that the material contents 12 may be dispensed by gravity when heated. A supply means 19 is connectable to the holding container 18 for receiving, heating and injecting a supply carrier liquid 13 into the container against the material 12 to melt the material to a flowable state and drain it from the container.

A drain means 20 receives the melted, flowable material and heated liquid. This mixture is delivered to a circulating means 21 associated with the supply 19 and drain 20, for continuously circulating and mixing the heated liquid 13 and material 12 and for selectively discharging the mixture through the applicator means or nozzle 15.

The container 18 briefly discussed above is shown in detail in FIGS. 1 through 3. The container 18 includes a top end 23 and an opposite bottom end 24. A fitting 25 is provided at the bottom end for connection to the drain means 20 and supply means 19. This fitting 25 is best illustrated in FIG. 3.

The container also includes securing means in the form of a hanger loop 26 situated adjacent the top end 23. This loop receives a bracket 27 on a rigid upright 28 (FIG. 1) of the present structure. The hook will therefore releasably support the container. A horizontal "U" shaped brace 29 is also affixed to the upright 28. The container as shown in FIG. 2 can be removed from the bracket 27 and brace 29. This facilitates replenishment of the material 12 to the present system. For example, the container can be removed and refilled with the material. Alternatively, the material can be supplied directly in the containers so when empty, a used container may simply be disposed of. It is preferable, however, that the containers be reusable to avoid waste and increased cost of materials to the ultimate user.

A handle 30 is provided at the container bottom end 24. The handle 30 will facilitate transporting the container in an inverted condition where the fitting 25 is turned upward to facilitate filling and avoid the possibility of spillage. The handle and hanger loop 26 can be an integral part of the container or attachments thereto, depending upon the method of manufacture used.

A liquid delivery means 31 is provided for supplying the liquid 13 to the supply means 19. In FIG. 1, the delivery means is shown as a bucket or tank 32. It is also conceivable that the liquid (if water) be received directly from an existing water line by means of a tap line 33 as shown by dashed lines in FIG. 4. Either tank 32 or tap line 33 is used to deliver the liquid through a float valve arrangement 34 into a mixing tank 35. The float valve 34 is situated within the mixing tank 35 and is connected to the liquid delivery means 31 to maintain a selected liquid level within the tank 35.

The mixing tank 35 is considered a component of the supply means 19. A line 37 extends from tank 35 to a heating means 38. Heating means 38 may be comprised of a conventional form of heater such as a water heater. When salves are used, it is desirable to set the heater 38 to a temperature between 115° and 130° (preferably 120°). Temperatures within this range are sufficient to melt or lower the viscosity of the material 12 and will not cause discomfort to the cows.

The heater 38 will receive a mixture of water and material 12 from the mixing tank 35 and deliver it through a line 40 to the intake 41 of a pump 42.

The pump 42 is considered as a part of the circulating means 21. It includes a discharge 43 that is connected to a line 44 leading to a jet means 45. The jet means 45 includes an injector jet nozzle 36 adjacent the drain means 20 for spraying a jet of heated carrier liquid 13 against material 12 within the container 18. The liquid 13, previously heated by the heating means 38, will impinge against the material 12, heating it to a flowable state. The heater material will drain downwardly through the fitting and into the drain means 20. The drain means will deliver the flowable material 12 and heated liquid into the mixing tank 35 where it is again circulated through the heater and pump.

The circulating means 21 also includes the applicator means 15 as a circulating branch for the heated mixture of material 12 and carrier liquid 13. This includes a branched fitting 56 attached to the discharge 43 of the pump. One branch of the fitting 56 is connected to line 44 while the remaining branch is connected to a line 57 leading to a "T" nozzle fitting 58. A return line 59 extends from the "T" fitting 58 at the applicator nozzle 15 back to discharge into the mixing tank 35.

The pump 42 will continuously cycle heated carrier fluid and mixed material through the line 57 to the applicator nozzle 15 then back to the mixing tank 35. The material will remain in its flowable, heated condition and will not solidify in the lines. The applicator nozzle 15 can be actuated at any time to dispense a mixture of the carrier liquid and material.

FIG. 3 indicates the nature of the drain means 20. It may be comprised of a hollow drain line 48 that is mounted to the container fitting 25 by a threaded cap member 51. A top opening 49 of the drain line 48 opens into the container through the fitting 25 when the cap 51 is threaded in place. This opening is directly adjacent to the injector jet nozzle 36. Material 12 melted by the heated carrier liquid 13 will flow through the fitting and into the drain. This is very important to proper operation of the present device.

The heated carrier fluid injected through the jet nozzle 36 will impinge or be trained against the material directly adjacent the container fitting 25. The heated carrier fluid will melt the material to a flowable state. It will then flow by gravity into the fitting and be received by the drain. An indentation or recess is gradually formed in the material (FIG. 4) by the incoming jet of heated carrier liquid. This leaves the adjacent drain opening 49 free to receive the injected liquid and presently melted and flowable material.

In fact, it is preferable to provide the line 44 coaxially or concentrically within the drain line 48 such that the heated incoming liquid 13 will, by conduction, continue to heat the draining material 12 as it is received through the drain. Also, the coaxial relationship of the nozzle 36 and drain opening 49 is such that the drain opening is substantially centered within the concavity or recess in the material 12 produced by the discharging jet of fluid. This assures the area of the drain opening 49 will be constantly heated by the line 44 and will not clog with cooling material.

The drain 48 extends from the open top end 49 to a bottom end 50 opening into the mixing tank 35 where the carrier liquid and melted material are discharged. This mixture, as indicated above, is then allowed to be cycled through the heating means, and pumped through the circulating means 21, back to the mixing tank or ejected outwardly through the applicator spray nozzle 15.

The concentration or ratio of the liquid carrier 13 to the material 12 may be selectively controlled by a valve 60 (FIG. 4) situated in line 44. This valve 60 can be actuated to divert flow back into the mixing tank for circulation within the supply means. No heated mixture will then be recycled back to the holding container 18. No further material 12 will be melted and discharged through the drain back into the mixing tank.

As the mixture is discharged through the nozzle 15, more carrier liquid will be delivered through the float valve to maintain the level. The valve 60 can then be opened to inject newly added carrier liquid 13 into the material 12 to regain the previous mixture consistency. The mixture is maintained in suspension or a mixed state due to the circulating nature provided with the present system.

When used as an applicator for applying salve to cow udders and teats, the nozzle is used simply as a conventionally available spray nozzle and is actuated to discharge a spray of the mixture onto the cow udder. The water will rinse the udder and teats while the salve material 12 will be applied by the force of the spray to the tissues. The warm material opens the pores of the skin tissue and allows the salve to penetrate, thereby maximizing its beneficial effects.

The mixture remains even due to circulation within the present system. The material can be applied evenly and at a concentration selected to be adequate for the intended purposes.

If the present system is to be used with another normally viscous material 12 such as molasses, the same system and procedure is used. The same spray nozzle arrangement can be utilized to spray a mixture, for example, of heated water and molasses over feed grain for nutritional treatments.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A livestock treatment system for producing and selectively discharging a liquified mixture of carrier liquid such as water and a material such as salve or molasses held in a material holding container, said material being flowable when heated, said system comprising:

bracket means for releasably supporting the material holding container;

an elongated drain tube extending between a bottom end and an open top end, the top end being situated adjacent the bracket means and adapted to extend into the material holding container supported on the bracket means, to receive and drain material therefrom;

a mixing tank connected to the drain tube to receive material through the bottom end thereof;

carrier liquid delivery means for supplying carrier liquid to the mixing tank;

circulating means for cycling carrier liquid and said material through a circuit including the mixing tank;

heating means in said circuit for heating the carrier liquid passing through the circuit to a temperature sufficient to reduce the material to a flowable state;

jet means connected to the circulating means with a nozzle adjacent the drain tube top end, for spraying a jet of heated carrier liquid against material within the container releasably supported on the bracket means so material within the container directly adjacent the nozzle will be engaged by the heated carrier liquid and will be reduced to a flowable state by the heated carrier liquid and will flow with the carrier liquid as a liquified mixture through the drain tube to the mixing tank; and wherein the circulating means includes an applicator means for selective operation to discharge the liquified mixture.

2. The livestock treatment system as claimed by claim 1 wherein the nozzle of the jet means is disposed within the open top end of the drain tube.

3. The livestock treatment system as claimed by claim 1 wherein the carrier liquid delivery means includes a carrier liquid supply container and a delivery line leading from the supply container into the mixing tank.

4. The livestock treatment system as claimed by claim 1 wherein the circulating means includes a pump having an intake and a discharge and wherein the intake is connected to the mixing tank and heating means and the discharge is connected to the jet means.

5. The livestock treatment system as claimed by claim 4 wherein the applicator means includes:
   a manually actuatable nozzle;
   a delivery line having one end connected to the discharge of the pump and a remaining end connected to the nozzle;
   a return line having one end opening into the mixing tank and a remaining end connected to the delivery line adjacent the remaining end thereof.

6. A liquid applicator for livestock treatment for selectively spraying a heated liquid mixture of water and a material from a material container rendered flowable by the heated water, comprising:
   a mixing tank;
   means for supplying water to the mixing tank;
   means for heating water from the mixing tank;
   pump means for receiving water heated by said heating means and for pumping the heated water through a discharge;
   injector jet means connected to the pump discharge for forming a jet of heated water;
   bracket means adapted to releasably mount the material container in relation to the injector jet means such that the jet of heated water may be directed against material held therein to heat the material to a flowable state;
   drain means comprised of a tube extending from the mixing tank to a top end adjacent the injector jet means for receiving heated water and material rendered flowable by the heated water, and for delivering the flowable material and heated water into the mixing tank;
   cycling means connecting the mixing tank and pump means for continuously cycling water and flowable material through a circuit including the mixing tank and heating means to continuously mix and heat the water and flowable material; and
   an applicator nozzle means in the circuit of the cycling means selectively operable to spray the mixed water and flowable material.

7. A livestock treatment system for producing and selectively discharging a liquified mixture of carrier liquid such as water and a material such as salve or molasses that is flowable when heated, said applicator comprising:
   a holding container for the material, having a top end and a bottom end;
   an elongated drain tube extending between an open bottom end and an open top end with the top end opening into the bottom end of the material holding container to receive and drain material therefrom;
   a mixing tank separate from the container and connected to the bottom end of the drain tube;
   circulating means for cycling carrier liquid and said material through a circuit including the mixing tank;
   heating means in said circuit for heating the carrier liquid passing through the circuit to a temperature sufficient to reduce the material to a flowable state;
   jet means connected to the circulating means with a discharge nozzle adjacent the drain tube end, for spraying a jet of heated carrier liquid against material within a container supported on the bracket means so the material engaged thereby will be reduced to a flowable state by the heated carrier liquid and will flow with the carrier liquid as a liquified mixture through the drain tube to the mixing tank; and
   wherein the circulating means includes an applicator means for selective operation to discharge the liquified mixture.

8. The livestock treatment system as claimed by claim 7 wherein the material container is portable and further including means for releasably securing the container to the the drain tube and jet means.

9. The livestock treatment system as claimed by claim 7 wherein the discharge nozzle of the jet means is concentric within the open top drain tube end.

10. The livestock treatment system as claimed by claim 7 wherein the heater means is separate from the mixing tank; and
    wherein the circulating means interconnects the mixing tank and heater means for continuously cycling liquid and flowable material through the mixing tank and heater means.

11. The livestock treatment system as claimed by claim 7 wherein the circulating means includes a manually actuated spray applicator nozzle.

12. The livestock treatment system as claimed by claim 11 wherein the circulating means further includes a delivery line leading from the mixing tank to the spray nozzle and a return line leading from the spray nozzle to the supply means such that the liquified mixture may be continuously cycled through the delivery and return lines.

13. The livestock treatment system as claimed by claim 7 wherein the heater means is capable of heating the carrier liquid and material to a temperature within a range of 115° to 130° F.

14. The livestock treatment system as claimed by claim 7 further comprising:
    carrier liquid delivery means connected to the mixing tank for supplying carrier liquid to the mixing tank.

15. The livestock treatment system as claimed by claim 14 wherein the carrier liquid delivery means includes a valved line leading from the mixing tank and adapted to be connected to a source of carrier liquid.

16. The livestock treatment system as claimed by claim 7, further comprising bracket means for releasably supporting the material receiving container having a top end and a bottom end, mountable to the bracket means and having a fitting at the bottom end for mounting the open top end of the drain tube and the nozzle of the jet means.

* * * * *